May 14, 1957 V. P. MATHIS 2,792,499

SAWTOOTH WAVE GENERATOR

Original Filed March 9, 1953

INVENTOR:
VERNON P. MATHIS,

BY Julius J. Zaskalicky
HIS ATTORNEY.

2,792,499

SAWTOOTH WAVE GENERATOR

Vernon P. Mathis, Syracuse, N. Y., assignor to General Electric Company, a corporation of New York Continuation of application Serial No. 341,011, March 9, 1953. This application April 13, 1956, Serial No. 578,000

5 Claims. (Cl. 250—36)

Figure 1:
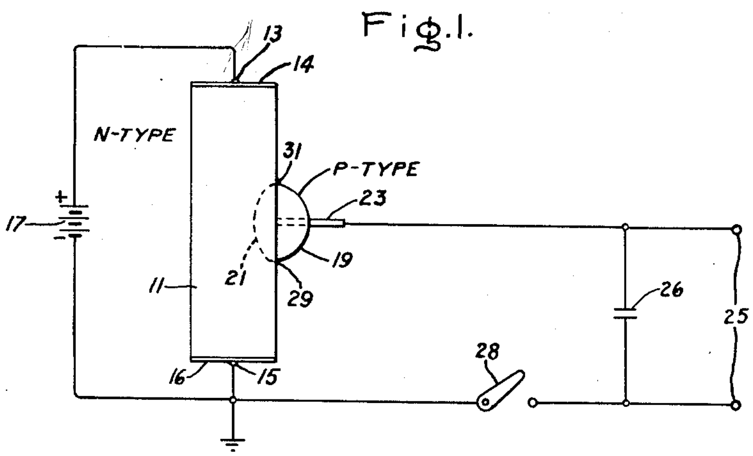

This invention relates generally to non-sine wave generators and has for a principal object the provision of a sawtooth wave generator utilizing a semiconductor device as the active element thereof.

This application is a continuation of application Serial No. 341,011, Vernon P. Mathis, filed March 9, 1953 now forfeited and assigned to the assignee of the present invention.

The theory of electric conduction in solids by means of electrons and "holes," as it is presently understood, is assumed to be well known to those skilled in this art. Therefore, only a brief summary of so much of the theory as is thought necessary to understand the present invention will here be presented.

As is well known, conduction in semiconductors is effected by two types of carriers which have different signs of effective charge. The negative carriers are free electrons while the positive carriers are missing or "defect" electrons or "holes." Semiconductors are termed N-type or P-type according to whether the movable charges normally present in excess in the material are electrons or "holes," respectively.

As is also well known, P–N junctions can be produced in semiconductors at will, which operate generally as rectifiers, and if the P-region is maintained at a positive potential relative to the junction, "holes" move from the P-region toward the N-region and electrons move from the N-region toward the P-region, the resultant current being generally referred to as the forward diode current. If the P-region is made negative with respect to the junction, the "holes" and electrons move in the opposite directions, e. g., away from each other and the region of the junction thus becomes almost void of movable charges, the resultant current referred to as the back current. This back current is thought to be composed mainly of hole-electron pairs created thermally in the region and is essentially independent of voltage.

In a copending application of I. A. Lesk, Serial No. 341,164, filed March 9, 1953, now Patent Number 2,769,926, and assigned to the assignee of the present application, there is disclosed a double-base diode element comprising a bar or crystal of N-type semi-conductive material such as germanium, silicon or the like, having a pair of contacts formed at opposite ends of the bar providing base-electrode terminals therefor. A P–N junction is formed by any suitable process at one face of the bar intermediate the said base-electrode ends, the P–N junction, in a preferred embodiment, consisting of a dot or pellet of indium or other equivalent material suitably fused onto the semiconductive bar.

As described and claimed in the above-mentioned copending application, when the P–N junction is connected to a source of biasing potential and is disposed in a unidirectional electric field set up between the base-electrodes of the bar, the junction operates in the forward direction, i. e., as an emitter over a portion of the junction area and in the back direction, i. e., as a collector over the remainder of the junction area.

This operation of the junction is caused by the biasing of one portion of the P–N junction in its forward direction, e. g., the direction of relatively high conductivity and the simultaneous biasing of the remainder of the junction in the reverse direction, e. g., the direction of relatively low conductivity. The current-voltage characteristic of the double-base diode, so biased, exhibits a region in which the current through the diode decreases as the applied voltage increases and vice versa, which will be recognized as a negative resistance characteristic.

In accordance with the present invention, when the P–N junction of the double-base diode is biased through a suitable electric storage device such as a capacitor, a self-excited generator of sawtooth oscillations is produced, the output oscillations having extremely linear voltage-rise portions followed by flyback portions of duration only a few percent of the rise portions.

It is, therefore, an object of the present invention to provide a linear sawtooth-wave generator which includes a semi-conductor device.

Another object of the invention is to provide an improved sawtooth-wave generator that operates without a filament power supply.

Still another object of the invention is to provide a novel sawtooth-wave generator which utilizes the negative-resistance characteristic of semiconductor devices to improve the linearity of the waveform of the output voltage produced by the generator.

Yet another object of my invention resides in the provision of a new and improved sawtooth-wave oscillator which is extremely simple, rugged, compact and small in size.

Briefly stated, in accordance with one aspect of my invention, a linear sawtooth-wave oscillator is provided which employs the negative resistance characteristics of a double-base semiconductor device to charge up a storage element by the reverse current of the device as the device displays a positive resistance characteristic and permits the discharge of the storage element as the device displays a negative resistance characteristic.

Figure 2:
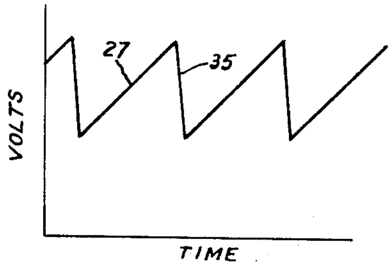

The features of my invention which I believe to be novel are set forth with particularity in the appended claims. My invention itself, however, both as to its organization and method of operation, together with further objects and advantages thereof, may best be understood by reference to the following description taken in connection with the accompanying drawings in which:

Figure 1 is a schematic diagram of the sawtooth oscillator embodying the principles of this invention; and Figure 2 is a graph illustrative of the operation of the oscillator.

Referring now to the drawing, there is shown, in Figure 1 thereof, a sawtooth-wave generator which comprises an elongated crystal body 11 of any suitable N-type semi-conductive material, such as germanium or silicon, which in one operative embodiment is approximately 5 millimeters long and of relatively small cross-sectional area. Ohmic contacts, as at 13 and 15, are formed in any suitable manner, as for example, by soldering conductive foils 14 and 16 at the opposed ends of the bar 11. To establish an axial unidirectional field in the body 11, the contact foils 14, 16 are connected to a suitable source of unidirectional potential, here conventionally indicated by battery 17.

If the crystal 11 is of substantially uniform cross section and resistivity, the potential gradient, as impressed by the battery 17, is substantially linear, and at a point on the crystal 11 approximately midway between the ohmic contacts 13 and 15, a P-type pellet or dot 19, which may be of indium or other suitable material, is fused or otherwise formed, thus producing a broad-area P–N rectifying junction indicated by the dotted area 21. The method of producing such a P–N junction, per se, is not my invention.

A probe electrode 23 makes contact with the junction 21 and electrode 23 is connected through a suitable storage device, such as condenser 26, to the negative terminal of the battery 17 which, in turn, is connected to ground in common with the ohmic contact 15. The output of the oscillator can be derived at terminals 25 connected across the condenser, as shown.

In operation, and considering the condenser circuit preliminarily open, as by the switch 28, the voltage of the battery 17 is impressed across the crystal 11 between ohmic contacts 13 and 15. The potential gradient, assuming uniformity of crystal cross section and resistivity, is substantially linear. Thus, with the geometry shown, the N-type semiconductive body near the junction area 21 is at an average potential of $$+\frac{E}{2}$$

with respect to ground, where E is the voltage of the battery 17.

When the condenser circuit is closed, the condenser 26 becomes charged by the back-current flow through the back resistance of the junction diode, inasmuch as the N-type germanium crystal 11 is then positive relative to the P-type dot 19. The potential across the condenser 26 rises linearly with time, as indicated by the curve 27 of Figure 2, which is plotted with voltage as ordinates and time as abscissas. The linearity of the rising voltage part is very good, because, as noted above, the diode back-current is substantially independent of voltage.

Although the average potential at the junction 21 is $$\frac{E}{2}$$

the actual potential varies from $$\left(\frac{E}{2}-V\right)$$

at the edge 29 of the junction area nearer the ohmic contact 15 to $$\left(\frac{E}{2}+V\right)$$

at the edge 31 of the junction nearer the ohmic contact 13, 2 v. being the total variation in potential throughout the contact area 21 along a diametral direction parallel to the axis of the crystal.

When the condenser 26 has been charged up to a level, such that $$V_c=\left(\frac{E}{2}-V\right)+\Delta$$

where $V_c$ is the charge on the condenser 26 and $\Delta$ is a small incremental voltage, the edge 29 of the contact area becomes positive with respect to the crystal 11 by an amount $\Delta$. At this instant, the part of the junction 21 adjacent edge 29 operates as an emitter and injects "holes" into the crystal 11, which tend to reduce to a relatively low value the resistance of the part of crystal 11 extending from the junction 21 to the contact 15. As a result, a relatively large part of the supply voltage E now appears across the part of the crystal 11 extending between the upper end contact 13 and the junction 21.

The condenser 26, accordingly, discharges through the low-resistance path provided by the part of the crystal 11 between the junction 21 and ground, this discharge being illustrated at 35 in the graph of Figure 2. Following the discharge of the condenser 26, the injection of "holes" terminates, the crystal portion having once again become positive and the potential gradient through the crystal 11 once again assumes its original linearity. The charging and discharging cycle of the condenser 26 is repeated, yielding the train of sawtooth waves shown in Figure 2.

In a successfully operating embodiment of my invention, sawtooth waves of approximately 4.5 volt peak to peak amplitude were derived using a battery supply of 22.5 volts. The frequency of the oscillations is determined by the time constant of the charging circuit including the back-diode resistance of the P–N junction 21 and the capacitance of the condenser 26. Very good linearity of waveform is obtainable over a range extending approximately from 0.03 to 20,000 cycles per second.

While I have shown and described certain preferred embodiments of my invention, it will be obvious to those skilled in the art that changes and modifications may be made without departing from the invention. I, therefore, aim in the appended claims to cover all such changes and modifications as fall within the true spirit and scope of my invention.

What I claim as new and desire to secure by Letters Patent of the United States is:

1. A sawtooth-wave oscillator, comprising an N-type semiconducting body between a pair of base electrodes, a source of unidirectional voltage connected across said base electrodes, means including a body of P-type semiconducting material forming with said N-type body a P–N junction in a region intermediate said base electrodes, an additional electrode making electrical contact with said junction, and reactive electric storage means connected in circuit between said additional electrode and one of said base electrodes.

2. A sawtooth wave oscillator, comprising a body of N-type semiconductive material having a relatively small dot of P-type material on a face thereof, a pair of electrodes on said body spaced in opposite directions from said dot, means for applying a unidirectional voltage between said electrodes, a probe electrode making a rectifier contact at the junction of said dot and said body, means biasing said probe electrode negative with respect to one of said pair of electrodes, said biasing means including a condenser adapted to be charged by the back current through said rectifier contact and discharged in the forward direction through said rectifier contact, and output terminals across said condenser for deriving a sawtooth oscillation therefrom according to the voltage variations of said condenser.

3. A sawtooth-wave generating circuit, comprising a body of semiconductive material having a pair of base electrodes disposed at spaced points on said body and means defining a rectifying junction at a region of said body intermediate said base electrodes, means to establish an electric field in said body between said base electrodes, an electrode in contact with said junction, means to bias said electrode relative to one of said base electrodes, said biasing means including an electric storage device adapted to be charged by the back-current flow across said junction for an interval of time sufficient to alter the sense of said bias with respect to a part of said junction independently of the bias with respect to the remainder of said junction, whereby the effective resistance of a corresponding part of said body is reduced to a relatively low value, said storage device thereafter discharging through said reduced resistance part to restore the altered bias, and output terminals across said condenser.

4. An electric wave generating circuit, comprising a body of semiconductive material having a pair of base electrodes disposed at spaced points on said body and means defining a rectifying junction at a region of said body intermediate said base electrodes, means to establish an electric field in said body between said base electrodes, an electrode in contact with said junction, means to bias said electrode relative to one of said base electrodes in a sense causing back current to traverse said junction, a condenser connected to said biasing means and adapted to be charged by the back current flow across said junction for a interval of time sufficient to alter the sense of said bias with respect to a part of said junction independently of the bias with respect to the remainder of said junction, whereby the effective resistance of a corresponding part of said body is reduced to a relatively low value, said condenser thereafter discharging through said reduced-resistance part to restore the altered bias, and output terminals across said condenser.

5. A sawtooth-wave generating circuit, comprising a relatively elongated body of N-type semiconductive material having a pair of base electrodes disposed at the respective ends of said body, a globular body of P-type semiconductive material contiguous with said elongated body and defining therewith a P–N junction at a region of said elongated body intermediate said base electrodes, means to establish an axial electric field in said body extending between said base electrodes, an electrode in contact with said junction and biased negative relative one of said base electrodes, a condenser connected between said junction and said one electrode, said condenser being adapted to be charged by the back-current flow across said junction for an interval of time sufficient to alter the sense of said bias with respect to a part of said junction independently of the bias with respect to the remainder of said junction, whereby the effective resistance of a corresponding part of said body is reduced to a relatively low value, said condenser thereafter discharging through said reduced-resistance part to restore the altered bias, and output terminals across said condenser.

References Cited in the file of this patent

UNITED STATES PATENTS 2,702,838 Haynes ---------------- Feb. 22 1955